(12) United States Patent
Sekiyama et al.

(10) Patent No.: US 6,222,836 B1
(45) Date of Patent: Apr. 24, 2001

(54) ROUTE SEARCHING DEVICE

(75) Inventors: Hiroaki Sekiyama; Hironobu Sugimoto, both of Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 09/045,789

(22) Filed: Mar. 23, 1998

(30) Foreign Application Priority Data

Apr. 4, 1997 (JP) .................................................. 9-086945

(51) Int. Cl.⁷ ...................................................... H04Q 11/00
(52) U.S. Cl. ............................................................ 370/351
(58) Field of Search .................................... 370/351, 352, 370/254, 252, 389, 395, 400, 248, 229, 230–235, 237, 238, 239, 349, 428, 412, 404

(56) References Cited

U.S. PATENT DOCUMENTS

| 5,042,027 | * | 8/1991 | Takase et al. | 370/252 |
| 5,170,353 | | 12/1992 | Verstraete | 364/444 |
| 5,257,023 | | 10/1993 | Furuya | 340/995 |
| 5,265,092 | * | 11/1993 | Solouay et al. | 370/254 |
| 5,428,545 | | 6/1995 | Maegawa et al. | 364/444 |

FOREIGN PATENT DOCUMENTS

| 02 017407 | 1/1990 | (JP) . |
| 7-83680 | 3/1995 | (JP) . |
| 7-129893 | 5/1995 | (JP) . |
| 08 293094 | 11/1996 | (JP) . |
| 8-313285 | 11/1996 | (JP) . |

* cited by examiner

*Primary Examiner*—Dang Ton
(74) *Attorney, Agent, or Firm*—Pillsbury Winthrop LLP

(57) ABSTRACT

A device searches for an optimum route by estimating traffic information of a link whose traffic information cannot be obtained based on information from another link. Traffic information, such as a degree of congestion of link and a travelling time of link, is obtained by means of a transceiver, a FM antenna, and a receiver, and the optimum route is searched by an ECU for navigation. When there is a second link whose traffic information can not be obtained among links for searching routes, weighting of traffic information of a first link is performed according to a directional difference and a degree of separation (time or distance) between the first link and the second link, and then traffic information of the second link is estimated based on the traffic information weighted. The ECU for navigation searches the optimum route to destination using the traffic information estimated and displays it on a display.

14 Claims, 5 Drawing Sheets

PRESENT LOCATION

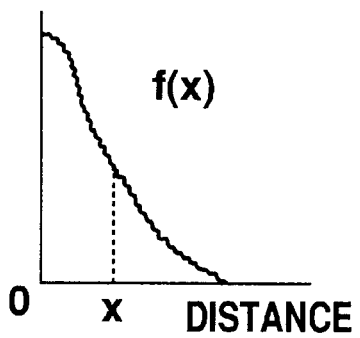 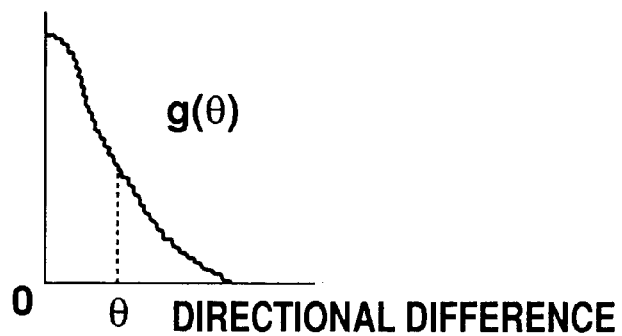
Fig. 8A          Fig. 8B
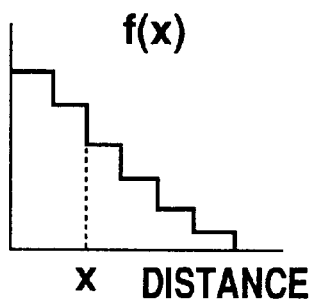 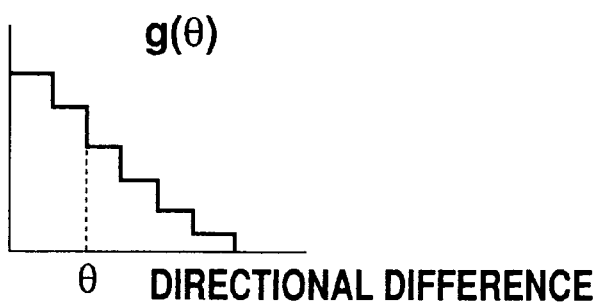
Fig. 9A          Fig. 9B
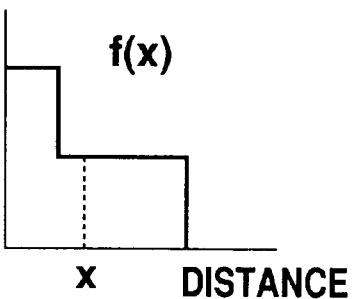 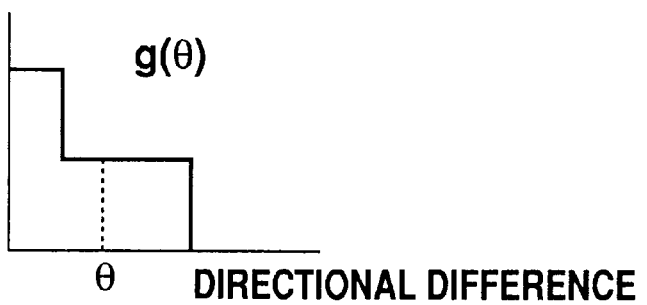
Fig. 10A          Fig. 10B

ROUTE SEARCHING DEVICE

BACKGROUND OF THE INVENTION

1. Field of the Invention

The present invention relates to a route searching device, and more specifically to a dynamic route guidance system (DRGS) for searching a route to a destination based on traffic information obtained from outside facilities.

2. Description of the Related Art

Heretofore, there has been proposed a dynamic route guidance system (DRGS) which searches a route to reach a destination in the shortest period of time based on traffic information, such as a link travelling time, obtained from an information center using a vehicle information communication system (VICS), and then informs a driver of the route. In such a system, traffic information of all the links should ideally be obtained. However, in actual situations, there are usually many links where a beacon cannot be installed or where traffic information can not be obtained due to non-conformity of the beacon installed. Therefore, it is very important to deal with such links in the search of the optimum route.

Taking into account the real word situation described above, in Japanese Patent Laid-Open Publication No. Hei 7-129893, the applicant of the present invention disclosed an art for finding a route by estimating a travelling time of a link for which the travelling time cannot be obtained, based on the travelling time of surrounding links. More specifically, average car speed is found from the travelling time and link length of links which are in front of and behind the link concerned. Then, the travelling time of the link is estimated on the assumption that the link can travel at the average car speed, on the assumption that an average travelling time of links which are parallel to the link on right and left will be the travelling time of the link. Thus, accuracy in the search of the optimum route can be improved in comparison with the case that there is no traffic information whatsoever.

However, the aforementioned art is only effective when at least one link whose traffic information can be obtained is adjacent to a link whose traffic information can not be obtained and it will be difficult to accurately estimate the traffic information of a link whose traffic information cannot be obtained if the link is far from a link or links whose traffic information can be obtained. Therefore, the aforementioned art has a certain limit ineffectively utilizing the dynamic route searching system.

SUMMARY OF THE INVENTION

The present invention is made in consideration of the problems of the art described above. It is directed to provide a device capable of increasing accuracy in the search of the optimum route by estimating, in a wider area than previously, traffic information for a link for which traffic information, such as a travelling time, can not be obtained.

In order to achieve the object mentioned above, the present invention includes arithmetic means for computing traffic information of the aforementioned second link by carrying out weighting of the traffic information of the aforementioned first link according to a difference in direction and distance between the first link and the second link when the route to a destination is searched by using a first link with its traffic information and a second link without its traffic information. Correlation between the traffic information of the first and second links differs depending on the direction and distance between the first link and the second link. In other words, if the first link and the second link are in the nearly same direction and close to each other, the traffic information of the first link will be very correlative to the second link. However, if the two links are in the same direction, but not near to each other, or if the two links adjoin, but are in a different direction, the traffic information of the first link will have less of a correlation with the second link. Therefore, if weighting of the traffic information of the first link is performed, in other word, the correlation is determined according to how the two links differ in direction and distance, traffic information of the second link will be estimated in a wider area than used was possible before.

Further, the present invention detects a change of the aforementioned traffic information of the first link with the passage of time, and the aforementioned arithmetic means perform weighting of the traffic information based on the aforementioned change. If the traffic information changes with the passage of time, circumstances of the second link will also change with the passage of time. For example, if traffic congestion of the first link tends to become worse, traffic congestion of the second link will also have a general tendency to worsen. Therefore, by determining weight of the traffic information of the first link at the time of estimating the traffic information of the second link in consideration of a change of the traffic information of the first link with the passage of time, accuracy in the search of a route can further be increased.

Further, computing means of the present invention perform weighting based on statistical traffic information. If there is some statistical traffic information, it will be utilized for the second link whose traffic information cannot be obtained. More specifically, by weighting such that an estimation value coincides with a statistical value, accuracy of estimation can be increased.

BRIEF DESCRIPTION OF THE DRAWINGS

FIGS. 8A and 8B are graphic diagrams showing weighting of estimation of degree of congestion.

FIGS. 9A and 9B are graphic diagrams showing further weightings of estimation of a degree of congestion.

FIGS. 10A and 10B are further graphic diagrams showing weighting of estimation of a degree of congestion.

PREFERRED EMBODIMENTS OF THE PRESENT INVENTION

First Embodiment

Figure 1:
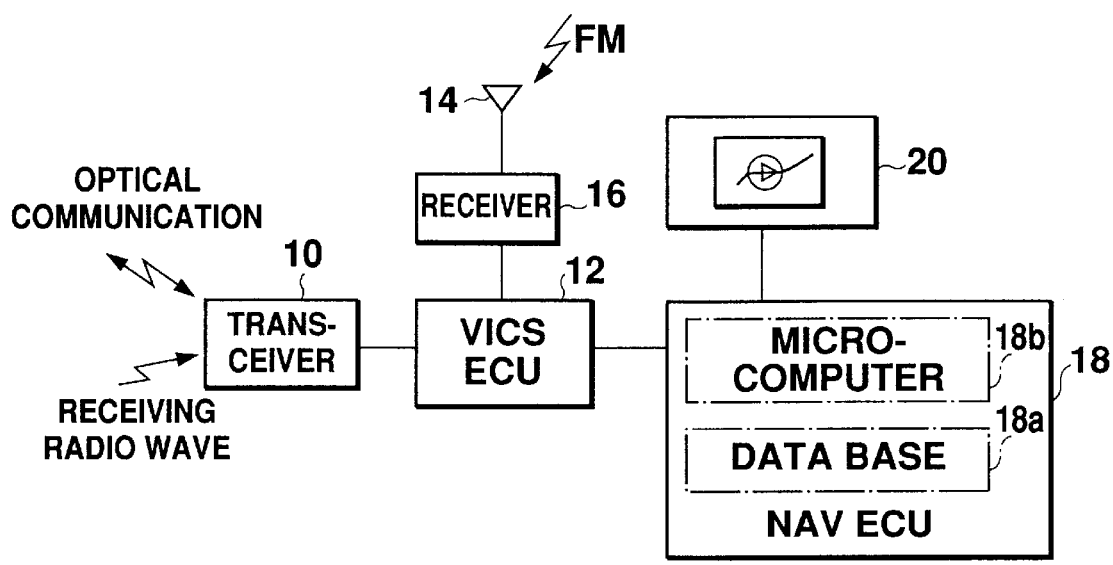
FIG. 1 is a block diagram showing a first embodiment of the present invention.

FIG. 1 is a block diagram showing overall constitution of the vehicle portion of the present invention in a first embodiment. A transceiver 10 obtains traffic information by communicating with an optical beacon or a radio beacon which installed along the side of a road or the like. Detailed traffic information of an area within a radius of 10 kilometers ahead is obtained from the optical beacon, and from the radio beacon traffic information of superhighways or roads which belong to the superhighway network. The traffic information contains the degree of congestion of each link, the travelling time of each link, and regulation of traffic such as road repairing. The degree of congestion is graded in a plurality of ranks, for example congested, crowded, or not crowded. The traffic information obtained is provided to an electric control unit (ECU) 12 for the VICS. A FM antenna 14 and a receiver 16 are provided, so that traffic information transmitted in a FM multiplex broadcast can be received. This traffic information is wide area traffic information within an FM receiving area, and the traffic information obtained is also provided to the ECU 12 for the VICS. Then, the ECU 12 for the VICS provides the traffic information (degree of congestion, link travelling time, regulation of traffic, etc.) to an ECU for navigation 18 (hereinafter referred to as navECU) The navECU 18 has a map data base 18a for storing map data including a link for displaying map and a link for searching route as well as a microcomputer 18b. The microcomputer 18b reads out the links for searching route are stored in the map database, and searches the route to reach a destination in the shortest time based on the traffic information provided from the ECU for VICS 12. At this point, with regard to a link whose traffic information cannot be obtained among the links for searching route, computing for the estimation of the traffic information of the link is performed based on a link whose traffic information can be obtained. The route obtained through the search is displayed on a display 20 as a recommended route to the destination.

Figure 2:
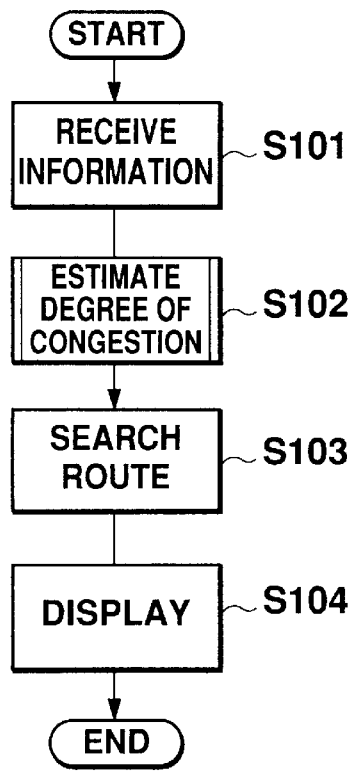
FIG. 2 is a flowchart showing overall processing.

FIG. 2 is a flowchart showing overall processing of a microcomputer in the navECU 18. First, traffic information, such as degree of congestion, travelling time of link, or the like is received (Step 101), and the degree of congestion of a link whose traffic information has not been obtained among links for searching routes is then estimated (Step 102). This process of estimating the degree of congestion is carried out by executing a processing program previously stored in a ROM of the microcomputer. Traffic information of a second link whose traffic information has not been obtained is computed by weighting traffic information of a first link, which has already been obtained, in accordance with a directional difference and/or degree of separation between the first link and the second link. A concrete method of weighting will be described later. A route to destination is searched by a known searching method (Dijkstra method, etc.) using a link which its traffic information has been obtained and the degree of congestion has already been known and a link for which the degree of congestion has been estimated (Step 103). This route searching is performed every time new traffic information is obtained. The route searched is superimposed on map data and displayed on a display 20 (Step 104). Of course, if there is information on regulation of traffic, such information can be displayed on display 20.

Figure 3:
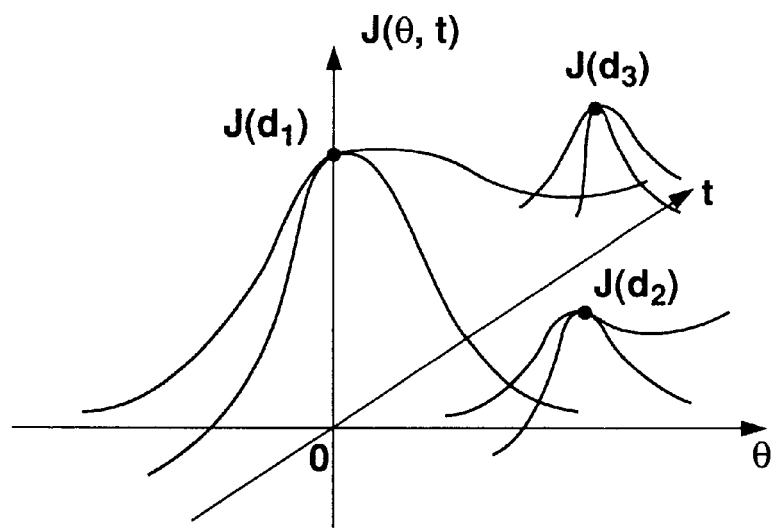
FIG. 3 is a three dimensional graphic diagram showing the correlation between a directional difference, a degree of separation (time interval), and a degree of congestion in the first embodiment.
Figure 4:
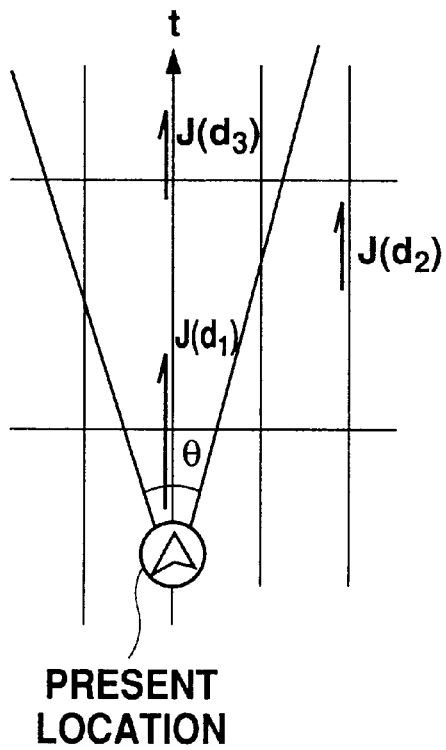
FIG. 4 is an explanatory drawing of a degree of congestion on an actual route in the first embodiment.

FIGS. 3 and 4 show typical estimation processes performed by the microcomputer (Step 102). FIG. 3 is a three dimensional map showing the degree of congestion J of a link whose traffic information has been obtained as a function of directional difference (θ) and/or a degree of separation (time interval t in the drawings) to a link to which the present location of a vehicle belongs, in which the present location is set as the center. FIG. 4 is an explanatory drawing showing a location of the congestion on an actual route. The link (d1) to which the present location belongs is a link whose traffic information is obtained, and a degree of the congestion is J1. A degree of the congestion J (d1) in a surrounding area resulting from the congestion J1 of the link d1 has the maximum point at the origin (namely, the degree of congestion J1 itself which is obtained), and decreases by a predetermined function (for example, normal distribution) with the increase of θ or t.

Generally, suppose α is a function of weight which is determined by the directional difference θ of the second link to the first link and/or the time difference t of the second link to the first link, the degree of congestion J (d1) of the neighboring second link which is caused by the congestion J1 of the first link can be expressed by the following equation:

$$J(d1) = J1 \cdot \alpha(\theta, t) \quad (\alpha \leq 1) \tag{1}$$

This means that the degree of congestion at a location of the first link has the highest degree of correlation and the degree of correlation decreases when θ or t increases.

Also, suppose there is a link d2 whose traffic information is obtained also at a location of (θ2, t2) as a contrast with link d1 and the degree of congestion of the link d2 is J2, similarly a degree of congestion J (d2) in a surrounding area of the link d2 will be maximum at the location of (θ2, t2) (namely, the degree of congestion J2 itself which is obtained), and will decrease by the predetermined function of weight α (θ0, t) with the increase of separation from the location (θ2, t2) . Further, suppose there is a link d3 whose traffic information is obtained at a location where the link d1 and the link d3 are in the same direction (directional difference is zero), but at a distance of t3 (time interval t3), namely (0, t3), and a degree of the congestion is J3, a degree of congestion J (d3) in a surrounding area of the link d3 will also be maximum at the location of (0, t3) (the degree of congestion J3 itself which is obtained), and it will decrease by the predetermined function of weight α (θ, t) with the increase of separation from the location (0, t3). This weighting is applied to all links for which traffic information has been obtained, and, by summing them, a three dimensional map in which θ and t are independent variables and the degree of congestion J is a dependent variable can be obtained.

As described above, the microcomputer estimates a degree of correlation of the first link with the second link by weighting the first link whose traffic information is obtained using one or more of the directional difference and the degree of separation (time interval) between the first link and the second link. The degree of congestion J of the second link whose traffic information is not obtained is then estimated from the resulting three dimensional map, such as shown in FIG. 3, and the traffic information is provided to all the links which are within the scope of search. Therefore, even though there exists a first link with its traffic information and a second link whose traffic information cannot be obtained, the optimum route can be found by effectively utilizing available traffic information.

Second Embodiment

In the first embodiment described above, traffic information of the second link is estimated by carrying out weighting using a prescribed weighting function according to the directional difference or the degree of separation between the first link whose traffic information is obtained and the second link whose traffic information is not obtained. On the other hand, in this embodiment, description is given of an example of further improving accuracy in estimation by carrying out weighting based on a change of the degree of congestion with the passage of time. Constitution of this embodiment is as shown in FIG. 1, but it is characterized in that the microcomputer in the navECU 18 detects the change of the degree of congestion with the passage of time which is provided from the ECU 12 for the VICS and determines the weight according to the change.

Figure 5:
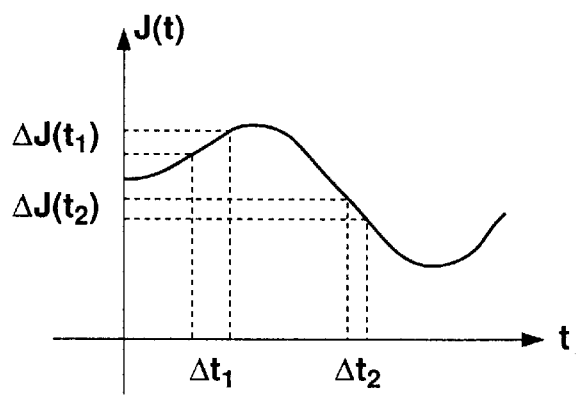
FIG. 5 is a graphic drawing showing a change of the degree of congestion with the passage of time in a second embodiment of the present invention.

FIG. 5 shows a state of such a change with the passage of time of one of the first links whose traffic information can be obtained. In this drawing, a horizontal axis shows time t and a vertical axis shows a degree of congestion, and a degree of congestion increases by $\Delta J$ (t1) at a time interval $\Delta tl$, whereas the degree of congestion decreases by $\Delta J$ (t2) at a time interval $\Delta t2$. Thus, the degree of congestion of a link changes with the passage of time. Therefore, for example, when the degree of congestion increases with the passage of time, a decrement shown in FIG. 3, namely, a decrement from a peak value which is prescribed by the function of weight $\alpha$ ($\theta$, t), is decreased. On the other hand, when the degree of congestion decreases with the passage of time, the decrement shown in FIG. 3, namely the decrement from the peak value which is prescribed by the function of weight $\alpha$ ($\theta$, t), is increased.

Figure 6:
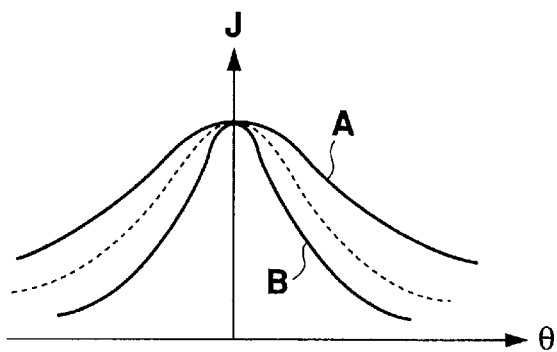
FIG. 6 is a two dimensional graphic diagram showing weighting of the estimation of a degree of congestion in the second embodiment.

FIG. 6 shows a state of changing the weighting according to a change of the degree of congestion with the passage of time. For the purpose of simplification, a two dimensional map of the directional difference $\theta$ and a degree of congestion is shown. In this drawing, a broken line shows the degree of congestion without any change with the passage of time in a surrounding area of the link whose traffic information is obtained, and it is same as the weighting shown in FIG. 3. On the other hand, a solid line A shows weighting when the degree of congestion with the passage of time is positive, in other words, the degree of congestion increases with the passage of time, and the decrement is lessen considering that the congestion tends to change for the worse. A solid line B shows weighting for a case in which a change of the degree of congestion with the passage of Lime is negative, in other words, the degree of congestion decreases with the passage of time, and the decrement is increased considering that the congestion tends to ease. More specifically, judging from the comparison of a degree of congestion J at a random location in the first embodiment with a degree of congestion J' at a random location in the second embodiment, if the degree of congestion increases with the passage of time, J' will be bigger than J, whereas if it decreases with the passage of time, J' will be smaller than J.

Thus, by adjusting the weighting according to change of congestion with the passage of time, accuracy in estimation of the second link whose traffic information cannot be obtained can be further increased, thereby facilitating the search of the optimum route.

Third Embodiment

In the first embodiment or the second embodiment described above, the traffic information of the second link is estimated based on the traffic information in real time which is provided from the ECU 12 for the VICS. However, if there is some statistical traffic information of the second link, it will be possible to increase accuracy in estimation of the traffic information of the second link by utilizing the statistical traffic information. Although the constitution of this embodiment is the same as that of FIG. 1, there is a difference between this embodiment and the first two embodiments in that statistical traffic data, for example, data concerning a degree of congestion is stored in a memory of the navECU 18 and read out as necessary to determine weighting.

Figure 7:
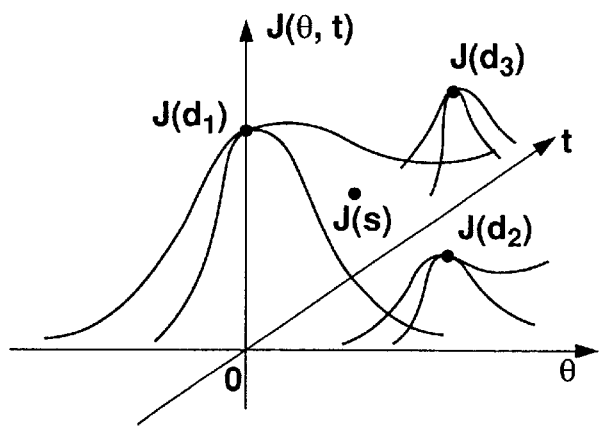
FIG. 7 is a three dimensional graphic diagram showing the correlation between a directional difference, a degree of separation (time interval), and a degree of congestion in a third embodiment of the present invention.

FIG. 7 shows weight in a case that a statistical value J (s) of a link in addition to the three dimensional map shown in FIG. 3. If there is such a statistical value J (s) of a link, weight of the traffic information of the first link will be determined so that an estimation value of the degree of congestion in the link coincides with the statistical value J (s). For example, when a value of the function of weight $\alpha$ ($\theta$, t) is set so that only a degree of congestion J (d1) of a single link is taken into consideration, the equation will be $$J(d1)=J1 \cdot \alpha(\theta, t) \tag{2}.$$

If the
statistical degree of congestion at the location ($\theta$s, ts) is J (s), the equation will be $$\alpha(\theta s, ts)=J (s)/J1 \tag{3}.$$

Thus, it is possible to accurately estimate the traffic information of a link having neither traffic information nor statistical data by effectively utilizing certain statistical data.

In each of the aforementioned embodiments, description is given of the traffic information taking the degree of congestion as an example. However, it is also possible to similarly estimate the travelling time of the second link having no traffic information from the travelling time of the first link having its traffic information.

Further, in each of the aforementioned embodiments, a time interval is shown as a degree of separation. However, it is also possible to use a distance between the first link and the second link as a substitute for the time interval.

Further, in each of the aforementioned embodiments, the function of weight $\alpha$ ($\theta$, t) or $\alpha$ ($\theta$, x) in which x is substituted for the distance t is exemplified by using normal distribution. However, it is also possible to use an arbitrary function whose value decreases with increasing $\theta$ or t, or $\theta$ or x. In FIGS. 8A to 10B, an example of such function of weight is shown. FIGS. 8A and 8B are normal distribution, as in each of the aforementioned embodiments, and an equation $$\alpha(\theta, x)=f(x)g(\theta) \tag{4}$$

is exemplified letting f (x) and g ($\theta$) be the normal distribution of a distance x between the first link and the second link and the normal distribution of a difference in direction $\theta$ between the first link and the second link, respectively. In FIGS. 9A and 9B, both f (x) and g ($\theta$) are transformed in steps. Accordingly, the function of weight $$\alpha(\theta, x)=f(x)g(\theta) \tag{5}$$

is also transformed in steps.

FIGS. 10A and 10B are weighted to facilitate estimation and f (x) and g ($\theta$) are changed into three steps.

Figure 11:
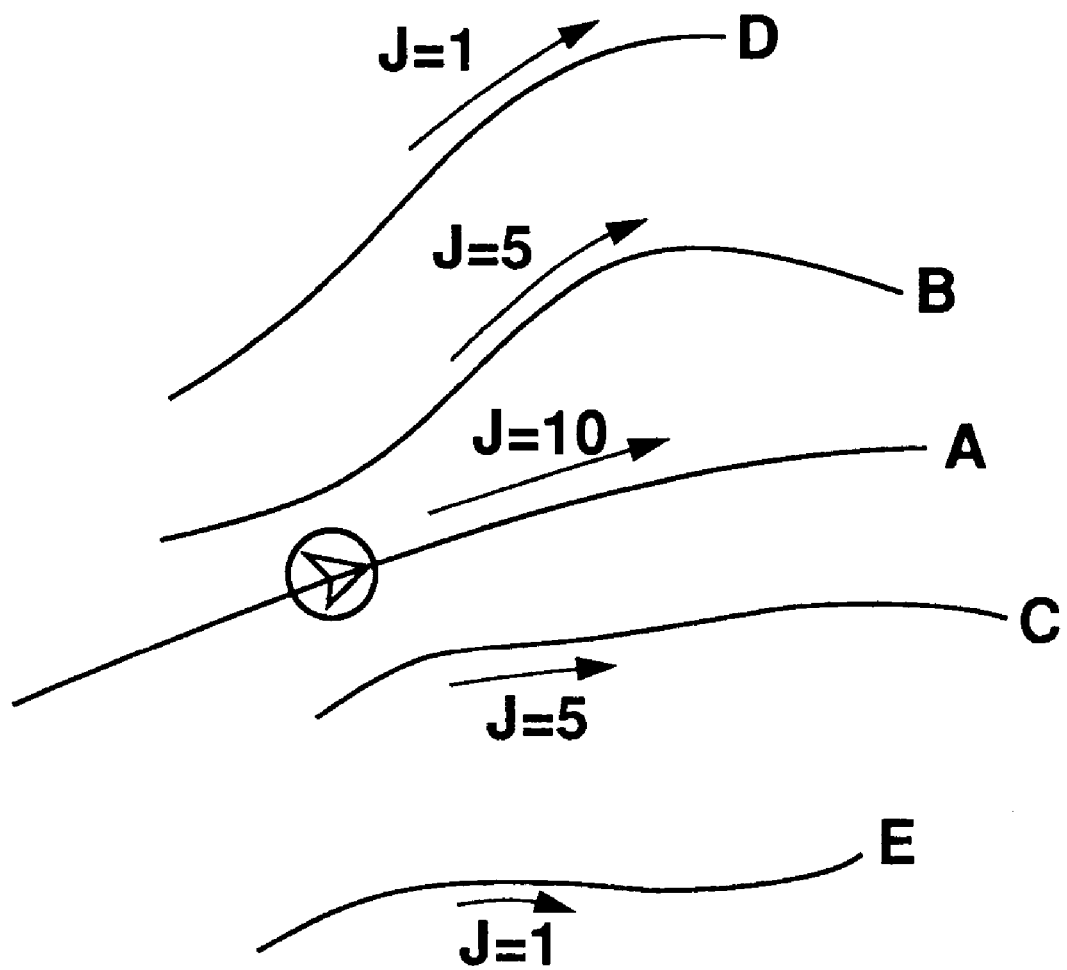
FIG. 11 is an explanatory drawing showing another method for estimating a degree of congestion.

Further, in each of the aforementioned embodiments, if there are, for example, a plurality of links whose directional difference of which is not great, one of the links is a first link whose traffic information is obtained, and around that first link there is a second link whose traffic information is not obtained, it will be possible to estimate traffic information in a simplified manner that only a degree of separation is an actual factor for weighting by letting the directional difference be zero. For example, as shown in FIG. 11, if there are five links A, B, C, D, and E the directions of which are more or less similar, only the link A is a first link, and a degree of the congestion J is 10, it will be possible to search a route by allocating the congestion J of five degrees evenly to second links B and C which are near the link A and the congestion J of one degree evenly to second links D and E which are further from the link A.

As described above, the present invention enables more accurate estimation of traffic information of an arbitrary link which the traffic information is not obtained. Therefore, accuracy in the search of the optimum route can be improved.

What is claimed is:

1. A route searching device for searching for a route to a destination comprising:

storage means for storing link data that relates to vehicular traffic information in links of a traffic route;

arithmetic means for computing traffic information of a second link having no traffic information by carrying out weighting of traffic information of a first link having traffic information stored in the storage means according to a directional difference and a degree of separation between said first link and said second link, the directional difference relating to a physical difference in direction between the first and second links and the degree of separation relating to an amount of physical separation between the first and second links; and search means for searching a route to said destination by using said first link and said second link.

2. The route searching device according to claim 1, wherein said weighting is the largest at a location of said first link and decreases from said location with increase of said degree of separation or said directional difference.

3. The route searching device according to claim 1, said device further comprising detecting means for detecting a change of said traffic information of said first link with passage of time, and wherein said arithmetic means carries out weighting of said traffic information of said first link based on the change of said traffic information with passage of time.

4. A route searching device for searching for a route to a destination comprising:

storage means for storing link data;

arithmetic means for computing traffic information of a second link having no traffic information by carrying out weighting of traffic information of a first link found in said link data according to a directional difference and a degree of separation between said first link and said second link;

search means for searching a route to said destination by using said first link and said second link, detecting means for detecting a change of said traffic information of said first link with passage of time, wherein said arithmetic means carries out weighting of said traffic information of said first link based on the change of said traffic information with passage of time, wherein said weighting value is greatest at the location of said first link and decreases from said location with increase of said degree of separation or said directional difference; when said change of said traffic information with passage of time is positive, a degree of decrease of time; and, when said change of said traffic information with passage of time is negative, a degree of decrease is more than when traffic information does not change with passage of time.

5. The route searching device according to claim 1, wherein said storage means stores statistical data of said traffic information, and said arithmetic means carries out weighting of said traffic information of said first link based on said statistical data.

6. A route searching device for searching for a route to a destination composing:

storage means for storing link data;

arithmetic means for computing traffic information of a second link having no traffic information by carrying out weighting of traffic information of a first link found in said link data according to a directional difference and a degree of separation between said first link and said second link; and search means for searching a route to said destination by using said first link and said second link, wherein said storage means stores statistical data of said traffic information, and said arithmetic means carries out weighting of said traffic information of said first link based on said statistical data, and wherein said weighting value is greatest at a location of said first link and decreases from said location with increase of said degree of separation or said directional difference in such a manner that said weighting coincides with said statistical data.

7. The route searching device according to claim 1, wherein said arithmetic means decreases step by step weighting of traffic information of said first link according to said degree of separation when said directional difference is substantially zero.

8. The route searching device according to claim 1, wherein said traffic information is a degree of congestion.

9. The route searching device according to claim 1, wherein said traffic information is link travelling time.

10. The route searching device according to claim 1, wherein said degree of separation is a time interval between said first link and said second link.

11. The route searching device according to claim 1, wherein said degree of separation is a physical distance between said first link and said second link.

12. A route searching device for searching for a route to a destination comprising:

a data base for storing link data that relates to vehicular traffic information in links of a traffic route;

a computer for computing traffic information of a second link having no traffic information by carrying out weighting of traffic information of a first link having traffic information stored in the storing means according to a directional difference and/or a degree of separation between said first link and said second link, the directional difference relating to a physical difference in direction between the first and second links and the degree of separation relating to an amount of physical separation between the first and second links, and for searching a route to said destination by using said first link and said second link.

13. The route searching device according to claim 12, wherein said computer carries out weighting of traffic information of said first link based on a change of said traffic information with passage of time.

14. The route searching device according to claim 12, wherein said computer carries out traffic information of said first link based on statistical data of said traffic information.

* * * * *